(12) United States Patent
Vellasques et al.

(10) Patent No.: US 10,670,415 B2
(45) Date of Patent: Jun. 2, 2020

(54) METHOD AND APPARATUS FOR PROVIDING MOBILITY-BASED LANGUAGE MODEL ADAPTATION FOR NAVIGATIONAL SPEECH INTERFACES

(71) Applicant: HERE GLOBAL B.V., Eindhoven (NL)

(72) Inventors: Eduardo Vellasques, Berlin (DE); Tadej Stajner, Berlin (DE); Augusto Hentz, Berlin (DE); Olivier Dousse, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 78 days.

(21) Appl. No.: 15/642,971

(22) Filed: Jul. 6, 2017

(65) Prior Publication Data

US 2019/0011278 A1   Jan. 10, 2019

(51) Int. Cl.
*G01C 21/34* (2006.01)
*G01C 21/36* (2006.01)
(Continued)

(52) U.S. Cl.
CPC ..... *G01C 21/3608* (2013.01); *G01C 21/3484* (2013.01); *G01C 21/3617* (2013.01);
(Continued)

(58) Field of Classification Search
CPC ............ G01C 21/3617; G01C 21/3608; G01C 21/3484; G10L 15/22
See application file for complete search history.

(56) References Cited

U.S. PATENT DOCUMENTS 8,255,217 B2   8/2012   Stent et al.
8,688,290 B2   4/2014   Jotanotive
(Continued)

OTHER PUBLICATIONS

Stent et al., "Geo-Centric Language Models for Local Business Voice Search", Proceedings of Human Language Technologies: The 2009 Annual Conference of the North American Chapter of the Association for Computational Linguistics, Jun. 2009, pp. 389-396.
(Continued)

*Primary Examiner* — Bryan S Blankenagel
(74) *Attorney, Agent, or Firm* — Ditthavong & Steiner, P.C.

(57) ABSTRACT

An approach is provided for mobility-based language model adaptation for navigational speech interfaces. The approach involves receiving a word lattice resulting from a speech recognition process applied on a speech input received from a user via a navigational speech interface. The word lattice includes a respective speech recognition score for each word in the word lattice. The approach further involves adapting a language model comprising a plurality of location entities according to a mobility relevance and a search relevance of the plurality of location entities to the user. In one embodiment, the mobility relevance and the search relevance are determined by computing a probability of the user visiting the location entities associated with said each word after the user queries for said each word. The approach further involves initiating a re-scoring of said each word in the word lattice using the adapted language model to generate a speech recognition output.

17 Claims, 10 Drawing Sheets

(51) Int. Cl.
*G10L 15/22* (2006.01)
*G10L 15/19* (2013.01)
*H04M 1/60* (2006.01)
*G10L 15/26* (2006.01)
*G06F 40/00* (2020.01)

(52) U.S. Cl.
CPC ......... *G01C 21/3629* (2013.01); *G06F 40/00* (2020.01); *G10L 15/19* (2013.01); *G10L 15/22* (2013.01); *G10L 15/26* (2013.01); *H04M 1/6075* (2013.01); *G10L 2015/226* (2013.01)

(56) References Cited

U.S. PATENT DOCUMENTS

| | | | |
|---|---|---|---|
| 9,031,845 B2 | 5/2015 | Kennewick et al. | |
| 9,127,950 B2 | 9/2015 | Raux et al. | |
| 2008/0243783 A1* | 10/2008 | Santi | G06Q 30/02 |
| 2009/0030698 A1* | 1/2009 | Cerra | G10L 15/30 |
| | | | 704/275 |
| 2009/0319176 A1* | 12/2009 | Kudoh | G01C 21/3617 |
| | | | 701/408 |
| 2010/0036601 A1* | 2/2010 | Ozawa | G01C 21/00 |
| | | | 701/465 |
| 2010/0211304 A1* | 8/2010 | Hwang | G01C 21/3484 |
| | | | 701/532 |
| 2011/0093265 A1* | 4/2011 | Stent | G10L 15/06 |
| | | | 704/243 |
| 2011/0238289 A1* | 9/2011 | Lehmann | G01C 21/3438 |
| | | | 701/533 |
| 2012/0101810 A1 | 4/2012 | Kennewick et al. | |
| 2013/0066548 A1* | 3/2013 | Gruen | G01C 21/3617 |
| | | | 701/410 |
| 2013/0238332 A1* | 9/2013 | Chen | G10L 15/183 |
| | | | 704/240 |
| 2013/0346077 A1* | 12/2013 | Mengibar | G10L 15/265 |
| | | | 704/235 |
| 2014/0108307 A1 | 4/2014 | Raghunathan et al. | |
| 2014/0222435 A1* | 8/2014 | Li | G01C 21/3608 |
| | | | 704/275 |
| 2015/0228279 A1* | 8/2015 | Biadsy | G10L 15/26 |
| | | | 704/235 |
| 2015/0379995 A1 | 12/2015 | Sims, III et al. | |
| 2017/0032781 A1* | 2/2017 | Sharifi | G10L 15/197 |
| 2017/0162191 A1* | 6/2017 | Grost | G10L 15/075 |
| 2018/0158455 A1* | 6/2018 | Georges | G10L 15/065 |
| 2018/0174580 A1* | 6/2018 | Kim | G10L 15/30 |

OTHER PUBLICATIONS

Bocchieri et al., "Use of Geographical Meta-Data in ASR Language and Acoustic Models", International Conference on Acoustics Speech and Signal Processing (ICASSP), IEEE, Mar. 14-19, 2010, 4 Pages.
Whittaker et al., Abstract of "User Tailored Generation in the Match Multimodal Dialogue System", Semantic Scholar, 2010, 4 Pages.
Rieser et al., "Natural Language Generation as Incremental Planning Under Uncertainty: Adaptive Information Presentation for Statistical Dialogue Systems", IEEE/ACM Transactions on Audio, Speech, and Language Processing, vol. 22, No. 5, May 2014, pp. 979-994.

* cited by examiner

METHOD AND APPARATUS FOR PROVIDING MOBILITY-BASED LANGUAGE MODEL ADAPTATION FOR NAVIGATIONAL SPEECH INTERFACES

BACKGROUND

To improve user experience, many modern navigation and/or other location-based systems (e.g., embedded systems such as in-vehicle navigation systems, as well as standalone systems such as personal navigation devices and/or mobile devices running navigation applications) provide for voice-based interactions. For example, a voice destination entry (VDE) system is able to configure the destination of the navigation system via a speech interface. However, implementing automatic speech recognition (ASR) for the speech interface can be a significant technical challenge particularly in embedded and portable systems where available resources (e.g., memory, processing power, network bandwidth, etc.) can be limited. For example, having a larger number of valid utterances to provide for more natural voice interaction also means dedicating more system memory to a larger speech decoding graph (e.g., a graph for converting utterances in a voice input signal into geographic information such as a navigation destination). Accordingly, service providers and device manufacturers face significant technical challenges to enabling efficient and natural speech interactions, particularly in resource-constrained devices.

SOME EXAMPLE EMBODIMENTS

Therefore, there is a need for improving recognition performance, which can be met by an approach for providing mobility-based language model adaptation for navigational speech interfaces.

According to one embodiment, a computer implemented method for language model adaptation for a navigational speech interface comprises receiving a word lattice resulting from an automatic speech recognition process applied on a speech input received from a user via the navigational speech interface. The word lattice includes a respective speech recognition score for each word in the word lattice. The method further comprises adapting a language model comprising a plurality of location entities based on a mobility relevance and a search relevance of the plurality of location entities to the user. In one embodiment, the mobility relevance and the search relevance are determined by computing a probability of the user visiting the location entities associated with said each word after the user queries for said each word. The method further comprises initiating a re-scoring of said each word in the word lattice using the adapted language model. The method further comprises generating a speech recognition output for the speech input based on the re-scored word lattice.

According to another embodiment, apparatus for language model adaptation for a navigational speech interface comprises at least one processor, and at least one memory including computer program code for one or more computer programs, the at least one memory and the computer program code configured to, with the at least one processor, cause, at least in part, the apparatus to receive a word lattice resulting from an automatic speech recognition process applied on a speech input received from a user via the navigational speech interface. The word lattice includes a respective speech recognition score for each word in the word lattice. The apparatus is further caused to adapt a language model comprising a plurality of location entities based on a mobility relevance and a search relevance of the plurality of location entities to the user. In one embodiment, the mobility relevance and the search relevance are determined by computing a probability of the user visiting the location entities associated with said each word after the user queries for said each word. The apparatus is further caused to initiate a re-scoring of said each word in the word lattice using the adapted language model. The apparatus is further caused to generate a speech recognition output for the speech input based on the re-scored word lattice.

According to another embodiment, a non-transitory computer-readable storage medium for language model adaptation for a navigational speech interface carries one or more sequences of one or more instructions which, when executed by one or more processors, cause, at least in part, an apparatus to receive a word lattice resulting from an automatic speech recognition process applied on a speech input received from a user via the navigational speech interface. The word lattice includes a respective speech recognition score for each word in the word lattice. The apparatus is further caused to adapt a language model comprising a plurality of location entities based on a mobility relevance and a search relevance of the plurality of location entities to the user. In one embodiment, the mobility relevance and the search relevance are determined by computing a probability of the user visiting the location entities associated with said each word after the user queries for said each word. The apparatus is further caused to initiate a re-scoring of said each word in the word lattice using the adapted language model. The apparatus is further caused to generate a speech recognition output for the speech input based on the re-scored word lattice.

According to another embodiment, an apparatus for language model adaptation for a navigational speech interface comprises means for partitioning a global speech decoding graph into one or more spatial partitions. The apparatus also comprises means for receiving a word lattice resulting from an automatic speech recognition process applied on a speech input received from a user via the navigational speech interface. The word lattice includes a respective speech recognition score for each word in the word lattice. The apparatus further comprises means for adapting a language model comprising a plurality of location entities based on a mobility relevance and a search relevance of the plurality of location entities to the user. In one embodiment, the mobility relevance and the search relevance are determined by computing a probability of the user visiting the location entities associated with said each word after the user queries for said each word. The apparatus further comprises means for initiating a re-scoring of said each word in the word lattice using the adapted language model. The apparatus further comprises means for generating a speech recognition output for the speech input based on the re-scored word lattice.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing mobility-based language model adaptation are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
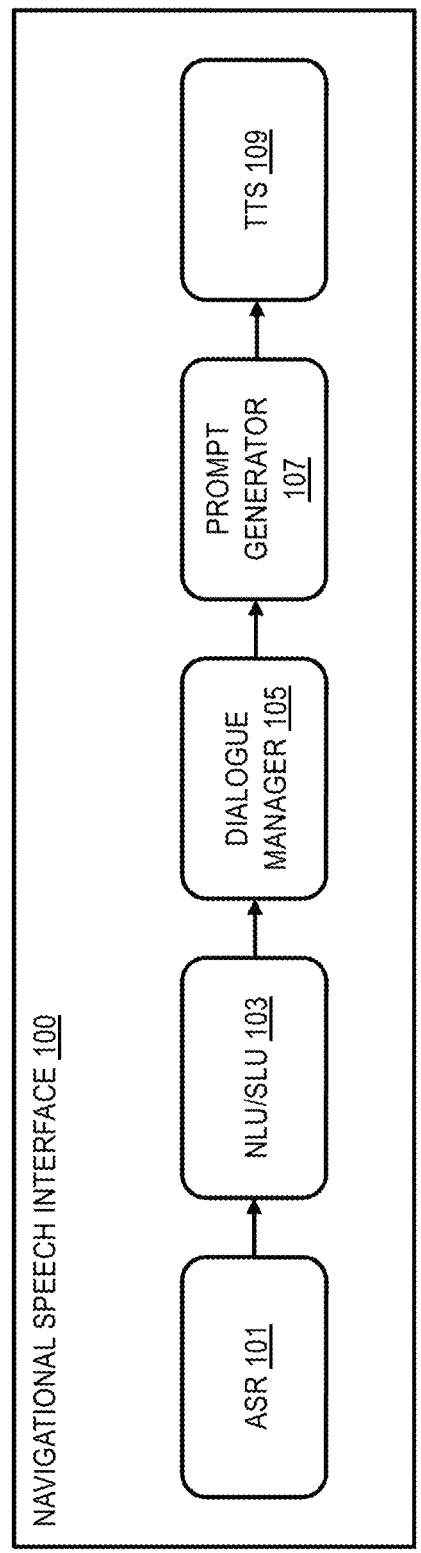
FIG. 1A is a diagram of a navigational speech interface, according to one embodiment.

FIG. 1A is a diagram of a navigational speech interface, according to one embodiment. Voice-based interaction with navigation and other location-based systems is becoming increasingly popular. For example, as navigation systems become more complex, voice-based interactions or control can make driving safer by reducing driver cognitive load and/or distractions by making system control more familiar. In one embodiment, a speech interface generally allows users to interact with a given system using voice. In the case of a navigational speech interface 100 as shown FIG. 1A, the system being controlled is typically a navigation or mapping related system in which the expected voice input relates to navigational or mapping terms, actions, etc. In a typical use case, a user interacts with a navigational speech interface 100 to perform a task by first engaging the system either using a hard-key (e.g., a button on a steering wheel) or by saying a keyword. Then the system emits an audio and/or visual feedback to let the user know that the system is "listening" (capturing audio).

Once the system is engaged, the user says a voice command that is captured as an audio input by the navigational speech interface. An example flow from this point is depicted in FIG. 1A. As shown, an automatic speech recognition (ASR) module 101 recognizes the command (e.g., transforms the audio into one or more recognition hypotheses). Then, a natural language understanding (NLU) or spoken language understanding (SLU) module 103 interprets the recognition hypothesis(es) to "understand" the action that the user is requesting to do (e.g., this means mostly detecting the user intent and mentions/names for each hypothesis). A dialogue manager 105 then generates a system act (e.g., compact representation of a system response) corresponding to the understood action. Next, the prompt generator 107 transforms the system act into a textual representation which is then transformed into an audio prompt by the text-to-speech module (TTS) 109.

Figure 1B:
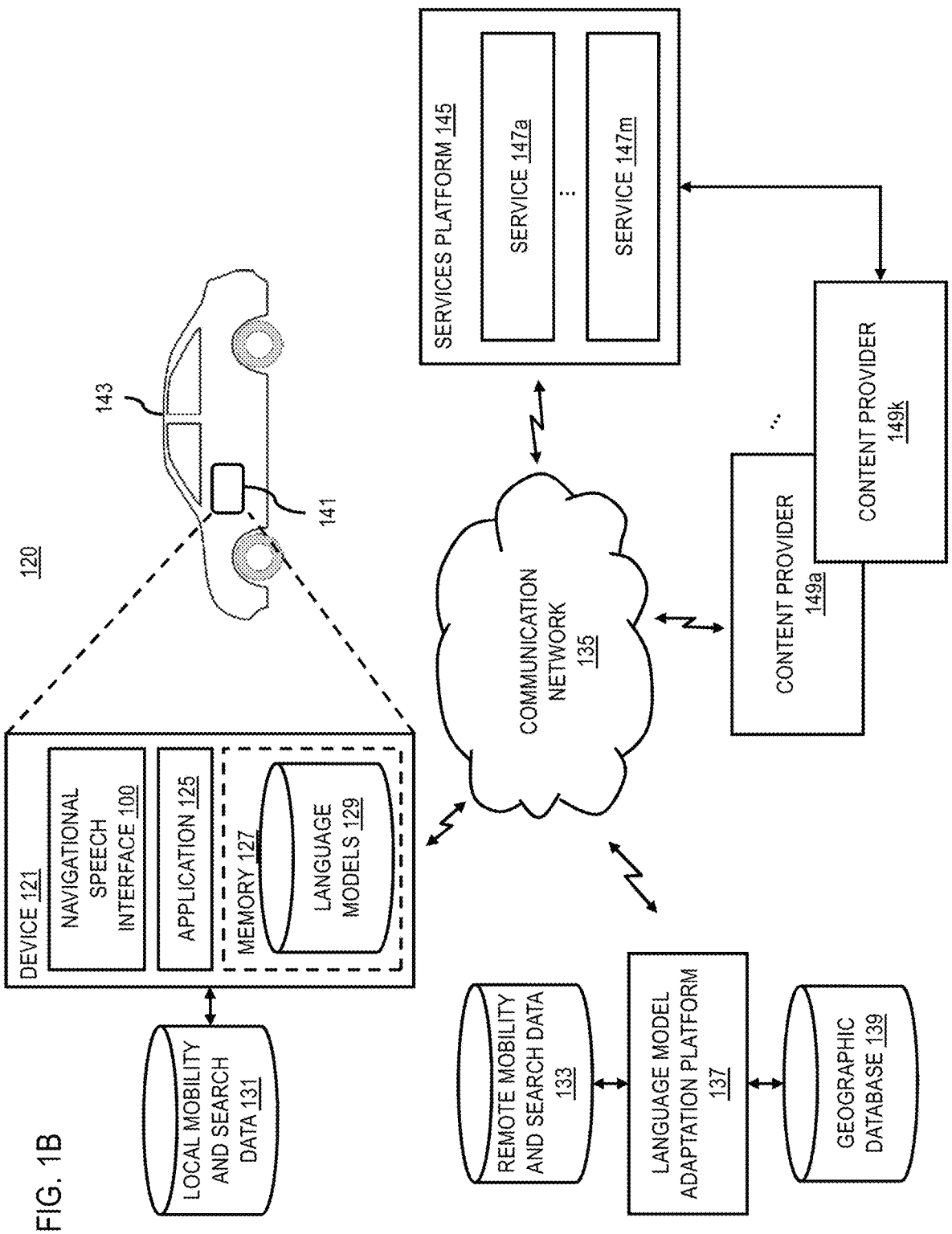
FIG. 1B is a diagram of a system for providing mobility-based language model adaptation for navigational speech interfaces, according to one embodiment.

In one embodiment, a system 120 of FIG. 1B (e.g., an automatic speech recognition system) includes the navigational speech interface 100 (e.g., as described with respect to FIG. 1A or other equivalent speech interface, for instance, in an embedded device 121. The system 120, for instance, introduces a capability to adapt language models used by the navigational speech interface 100 based on the mobility and search patterns of a given user. For example, the embodiments of the system 120 described herein leverages both search and mobility data to improve the likelihood that the ASR 101 of the navigational speech interface 100 can recognize names of places (e.g., points of interest (POIs), streets, etc.) and/or any other navigational or mapping related terms that are relevant for a given user.

In one embodiment, the relevance of a given word, name, term, etc. processed by the ASR 101 is a function of the search relevance for that word and mobility or locality relevance for the place or location named according to that word. For example, if a speech in an audio input is scored as initially having a likelihood to be recognized as either "Navigate to Sterling Bridge" or "Navigate to Berlin Bridge" (e.g., two terms that have similar phonetics and may difficult to distinguish from the audio input alone), the system 120 can determine mobility and/or search patterns of the user to determine which location (e.g., "Sterling Bridge" or "Berlin Bridge") is visited and/or searched more frequently by the user to adapt a language model for the specific user. In one embodiment, mobility and/or search patterns can also be affected by contextual parameters such as location, time, activity, etc. of the user or user device. The system 120 can then re-score the two terms using the adapted language model to determine which is more likely to be the intended input of the user based on the mobility and/or search data of the user. The more likely or higher scoring term can then be output by the system 120 as the speech recognition output for the user given the input audio sample. Accordingly, the embodiments described herein have applicability to the ASR 101 or other equivalent speech recognition component.

Figure 1C:
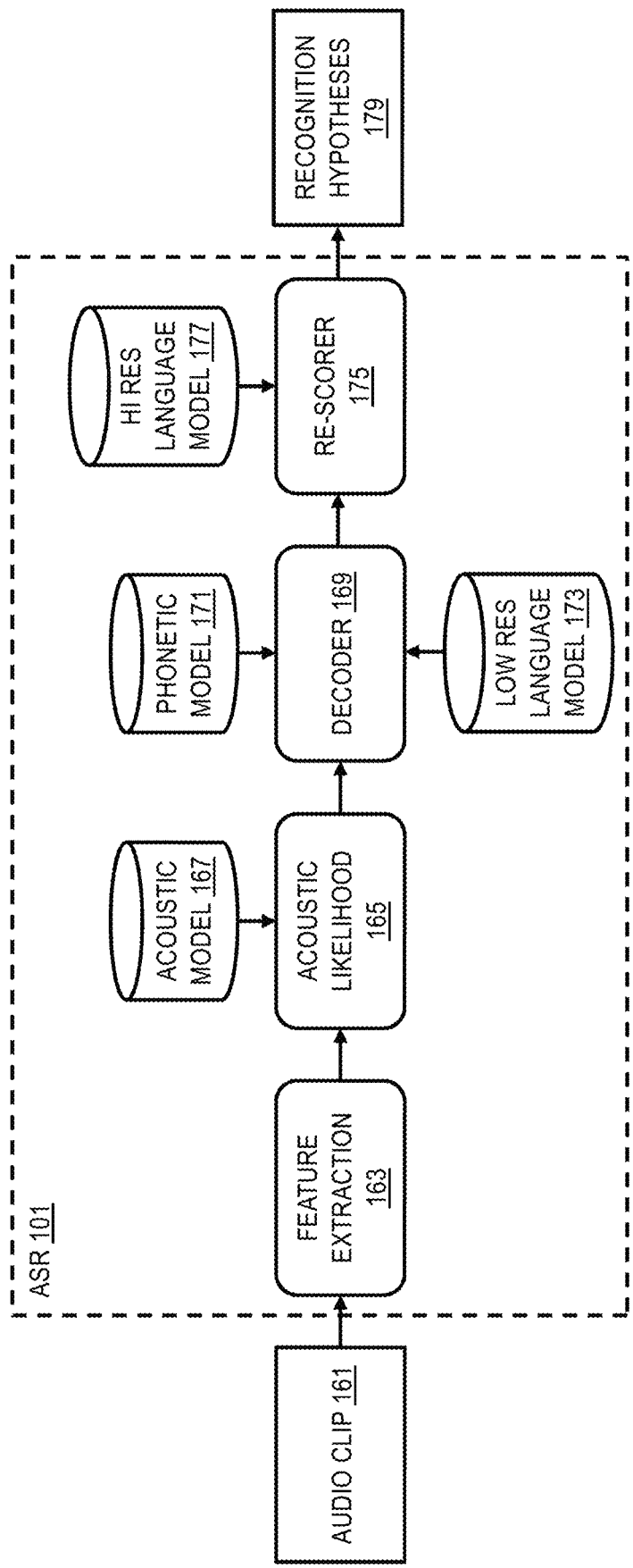
FIG. 1C is a diagram an automatic speech recognition module of the navigational speech interface, according to one embodiment.

FIG. 1C is a diagram example components the ASR 101 of the navigational speech interface 100, according to one embodiment. More specifically, the ASR module 101 shown in FIG. 1C is for large-vocabulary continuous speech recognition (LVCSR) scenarios for use with navigational speech interfaces. As shown, an audio clip 161 containing recorded speech from a user is input into the ASR module 101. In one embodiment, a feature extraction module 163 of the ASR module 101 analyzes a time window (frame) of the audio input 161 (e.g., of width 25 ms with a stride of 10 ms) and extracts frequency coefficients (e.g., according to a perceptual model). Then, an acoustic likelihood sub-module 165 estimates the probability of observing the frequency coefficients (of each frame) for a given phoneme using an acoustic model 167. A decoder 169 then will use the determined acoustic likelihood, a phonetic model 171, and a low resolution language model (LM) 173 to find the most likely sequence of words, sentences, or other equivalent terms, for that audio clip (represented as a word lattice). In one embodiment (e.g., in modern LVCSR systems), the phonetic model 171 and the low resolution language model 173 are represented as weighted finite state transducers (WFSTs) and "composed" together into a decoding graph (in some cases, other WFSTs also can be composed with the models 171 and 173 in the decoding graph).

In one embodiment, the word lattice generated by the decoder 169 is then re-scored by a high resolution language model 177, and the N most likely re-scored hypotheses 179 are output by the re-scorer 175. In this embodiment, the advantage of using two language models with different resolutions (e.g., low resolution language model 173 and high resolution language model 177) is that the high resolution language model 177 does not have to be composed with other WFSTs (such as phonetic models, context dependency transducers, etc.) resulting in a more efficient use of memory and CPU. In one embodiment, the system 120 adapts the high resolution language model 177 used by the re-scorer 175 according to user mobility and search patterns to improve a likelihood of recognition. However, in other embodiments, the embodiments of mobility-based language model adaptation described herein are applicable to any language model (e.g., high or low resolution, one or multiple, etc.) used by a navigational speech interface.

In one embodiment, a language model (e.g., language models 173 and 177) defines a probability of observing a sequence of words $W=\{w_1, \ldots, w_T\}$ of length T as:

$$P(W) = \prod_{t=1}^{T} P(w_t | w_1, \ldots, w_{t-1})$$

In one embodiment, the acoustic model 167 is estimated from an annotated corpus of speech samples. The language models 173 and 177 are estimated from a separate corpus of text data. One problem is that despite the surge in the size of text corpora, it can be very technically difficult to obtain representative data for domains like voice address entry, POI search, etc. Moreover, even if enough data is available, such global estimates may potentially be of little use for practical navigational speech interfaces since the probability that a certain navigational entity (such as a street) occurs in a speech input varies for each person.

By way of illustration and not limitation, the system 120 can approximate P(W) based on a context of n-words (e.g., an n-gram language model) or via other equivalent processes:

$$P(W) = \prod_{t=1}^{T} P(w_t | w_{t-n+1}, \ldots, w_{t-1}) \text{ where:}$$

$$P(w_i | w_{t-n+1}, \ldots, w_{t-1}) = \frac{count(w_t \cap w_{t-n+1} \cap, \ldots, \cap w_{t-1})}{count(w_{t-n+1} \cap, \ldots, \cap w_{t-1})}$$

In one embodiment, the frequency counts used in n-gram language models are computed from a separate corpus of text data. By way of example, a smaller n-gram order and generic text corpus can be used for the low resolution model 173, and a larger n-gram order and domain specific text corpus can be used for the high resolution language model 177.

In one embodiment, because of the potentially large vocabulary size for navigation or mapping related tasks such as address entry, the system 120 can partition the high resolution language model 177 into many sub-models (or sub-WFSTs): e.g., one for carrier phrases, where the names are collapsed into tags and one for each type of names that can occur in a given carrier phrase (e.g., one for street names, another one for city names, etc.). For example, for an address entry training utterance such as "Drive me to Pennsylvania Ave Washington D.C.", the location words are collapsed to tags resulting into "Drive me to <street-name> <city-name>" and then three separate models are estimated: one for the carrier phrases (with collapsed tags), one for the <street-name> tag and another one for the <city-name> tag. In such case, the tags are fields representing possible location-based values specific to a map or navigational related value and can become a special word in the carrier phrase model. The carrier phrase, for instance, is the template into which tags can be inserted to construct the complete utterance. Then, during re-scoring of the resulting word lattice by the ASR module 101, the language models for <street-name> and <city-name> are plugged into the <street-name> and <city-name> tags (replaced) of the carrier phrase model. More formally:

$$P(W) = \prod_{t=1}^{T} P(w_t | w_{t-n+1}, \ldots, w_{t-1}) P(w_t | C)^{1_C(w)} \text{ where:}$$

$$1_C(w) = \begin{cases} 1, \text{ if } w \in C \\ 0, \text{ otherwise} \end{cases}$$

for a tag C (e.g., a <street-name> tag, <city-name> tag, and/or any other location field tag).

In one embodiment, P(w|C) can be defined as a tag-based (or class-based) language model. By way of example, in one embodiment, very large tag models (such as language models of street names) can be assumed to contain words that are uniformly distributed, that is:

$$P(w | C) = \frac{1}{|C|}$$

In another embodiment, the system 120 can use popularity or some other similar metric to estimate P(w|C). For example, given the rank of word w∈C(r(w,C)), the system 120 can approximate P(w|C) as:

$$P(w | C) = 1 - \frac{r(w, C)}{\sum_{w \in W} r(w, C)}$$

By way of example, popularity can be very useful for domains such as POI search where reliable sources of ranking training data are available.

In one traditional approach known in the art, the system 120 can assume that the user will only look for POIs, addresses nearby, and then partition P(w|C) into several smaller models P(w|C, a), for each geographic area a∈A. Such a partitioned model is referred to as local area language models. For example, by an appropriate choice of partition, it can be possible to decrease the perplexity for local search even assuming a uniform distribution of names. In other embodiments, other map properties such as business density can be used define geo-centric partitions.

Although local area language models result in significant improvement in performance for voice-based local search, they assume that preference for words (given a tag) are global for a certain area. However, two users living in a same neighborhood can have different preferences of words, which can create problems of recognition accuracy.

One alternative approach would be to build user-specific language models off-line. But this requires transcribed user queries. Collecting and transcribing such type of query for each user is challenging and can raise privacy concerns. Moreover, such approach may not be feasible in an embedded device scenario (e.g., built-in vehicle navigation systems) since it would require sending data to a server, and generally embedded devices have no or limited connectivity options.

To address these problems, the system 120 adapts P(w|C) locally for each user to cope with the usage pattern of each person under these constraints. As mentioned before, in a typical LVCSR system a high resolution language model 177 is employed to re-score a word lattice generated by a decoder 169 that relies on a low resolution language model 173. In one embodiment, in a navigation scenario, the high resolution language model 177 is partitioned into one carrier phrase language model and multiple tag-based language models. In one embodiment, the tag-based language models include words, terms, location entities, etc. that can populate a location tag (e.g., <street-name> tag, <city-name> tag, etc.) typically found in the grammar of vocal commands received via the navigational speech interface 100. In one embodiment, to reflect user mobility preferences in generating speech recognition output, the system 120 adapts the tag-based language models (which can be local or not) according to a combination of search and locality relevance for each user.

In one embodiment, the system 120 first estimates the joint probability of visiting location $l \in L_w$ (where $L_w$ is the set of locations returned by the search engine for word w) and querying word w for tag C:

$$P(w,l|C) = P(l|w,C) P_{LM}(w|C)$$

where P(l|w, C) is the probability of visiting location l when a user queried word w (e.g., "Pennsylvania Ave") for tag C (e.g., <street-name> tag), and $P_{LM}(w|C)$ is the prior probability distribution (e.g., also known as a prior) of word w for tag C and is computed off-line (as mentioned before can be uniform or based on a rank). The prior probability distribution, for instance, is the distribution of word w for tag C before taking into account user specific data. In one embodiment, there are several possible ways to estimate P(l|w, C). For example, one is to retrieve the mobility graph score for each location returned by the search for word w, and then normalize it:

$$P(l | w, C) = \frac{\text{mobility}(l)}{\sum_{l_i \in L} \text{mobility}(l_i)}$$

where mobility(l) is the mobility model score of location l. Another possible way is to keep a histogram of the most frequent locations visited by a user for the N most frequent tag words.

In one embodiment, the mobility model score is based on several factors, including but not limited to, the spatial relevance and the trip probability. For example, the spatial relevance of the recognized location l is determined by the proximity of places that are part of the driver's or user's mobility history. In one embodiment, this can be approximated by selecting the places whose distance to the closest point (e.g., associated a location of the user or a user device) is below a certain threshold:

$$\text{Destinations} = \left\{ p_i \in \text{Places}; \min_{shape_{j,l} \in shape_l} \text{distance}(p_i, shape_{j,l}) < distance_{max} \right\}$$

In one embodiment, because the vocabulary of places of the recognition model generally is not aligned with the list of places, the system 120 uses geographic proximity as an alignment mechanism. Once a spatial relevance factor is obtained, the system 120 can estimate the probability of the user visiting the place given the current place and the current time: $P(p_i; p_{now}, time)$. By way of example, the time component can be modeled cyclically on either a daily or a weekly basis so that recurring commuting patterns can be used.

In one embodiment, the system 120 then marginalizes out the locations returned by search to get a mobility-based estimate for the probability of observing word w given tag C without reference to any specific location of search:

$$P(w \mid C) = \sum_{l_i \in L} P(w \mid C, l_i) P(l_i)$$

In one embodiment, the system 120 can then use P(w|C) as a score for word w in the adapted language model during the re-scoring process.

One advantage of the embodiments described herein is that the system 120 enables speech recognition language models (e.g., tag-based language models) according to mobility and search relevance. This mitigates at least a couple of issues with tag-based language models for navigational speech interfaces, namely: (1) even though popularity scores exist for certain navigational entities such as POIs, it is very difficult to derive such types of scores globally for other location-based entities, words, terms, etc. (e.g., streets, neighborhoods, etc.); and (2) global tag-based language models often are not representative of a specific user's interests or preferences from a user point of view since two persons living in the same neighborhood can have different preferences when querying for POIs or street names.

Accordingly, the various embodiments described herein enable leveraging information that, in some cases, is only available locally at a device such as the pattern of mobility of a given user (e.g., in an embedded scenario where local data generally is not transmitted to a backend server). Moreover, the language models of the embodiments described herein can be easily integrated into a local area language model by adding another "locality" prior to the model in the form of $P(l_i)$.

As shown in FIG. 1B, the system 120 comprises a device 121 (e.g., an embedded or standalone mobile device) including a navigational speech interface 100 for providing a speech interface for navigation, mapping, and/or other location-based services and/or applications. For example, the navigational speech interface can support global voice-based entry of geographic information including voice destination entry (VDE). It is noted that VDE is provided by way of illustration and not limitation, and that the various embodiments described herein are applicable to voice-based entry of any geographic information for any location-based service such as navigation, mapping, recommendations, general queries, etc. In this example, VDE is the act of recognizing an utterance representing a natural language spoken query to navigate to a specific location. Typically, locations are organized hierarchically, often with several distinct tags within the hierarchies (e.g., administrative units, postal codes, informal neighborhoods, and others) that can be represented as location tags (e.g., <street-name> tag, <city-name> tag, <house number> tag, <neighborhood> tag, <POI-name> tag, etc.).

In one embodiment, the speech interface 100 supports voice-based user interactions for an application 125 (e.g., a navigation application and/or any other application in which entry of geographic information is supported) executing on the device 121. The device 121 also includes a memory 127 (e.g., RAM memory, equivalent runtime memory, and/or other volatile memory) for storing language models 129 for use by the navigational speech interface 100. In one embodiment, the language models 129 can be adapted according to the various embodiments described (e.g., using user mobility and search data) for re-scoring speech input received by the speech interface 100. In one embodiment, the language models can be updated using local mobility and search data 131 stored on the device 121 and/or remote mobility and search data 133 available over the communication network 135 via, for instance, a language model adaptation platform 137.

In one embodiment, the language model adaptation platform 137 is a corresponding network component to the navigational speech interface 100. Accordingly, the navigational speech interface 100 (e.g., via the ASR module 101) and the language model adaptation platform 137, alone or in combination, can perform the functions related to mobility-based language model adaptation according to the various embodiments described herein. In one embodiment, language model adaptation platform 137 and/or the navigational speech interface have access to a geographic database 139 to facilitate, for instance, determining mobility and/or spatial relevance of words, terms, entities, etc. of the language models 129.

In one embodiment, the device 121 can be an embedded device or a standalone device. When implemented as an embedded device, the device 121 can be an embedded navigation system 141 of the vehicle 143 or a component of the navigation system 141. Accordingly, the speech interface 100 of the device 121 can be used to provide speech-based interactions (e.g., VDE functions) for the navigation system 141. Although the vehicle 143 is depicted as an automobile, it is contemplated that the vehicle 143 can be any type of transportation vehicle manned or unmanned (e.g., planes, aerial drone vehicles, motor cycles, boats, bicycles, etc.).

In one embodiment, when implemented as a standalone device, the device 121 can be a mobile device (e.g., a personal navigation system, smartphone, mobile computer, etc.) associated with any vehicle, person, or thing. In other words, the device 121, navigation system 141, and/or vehicle 143 are end user devices that are clients or consumers of navigation and/or mapping related services, and are capable of voice-based interactions with a user.

In one embodiment, the device 121, navigation system 141, and/or vehicle 143 may include sensors for reporting location-related measurements and/or other contextual attributes (e.g., time, weather, activity, lighting condition, etc.) for adapting the language models 129. The attributes can also be any attribute normally collected by an on-board diagnostic (OBD) system of the vehicle, and available through an interface to the OBD system (e.g., OBD II interface or other similar interface). These attributes can be activation of backup sensors, steering angle, activation of brakes, etc. that can potentially be indicative of parking-related behavior. In one embodiment, the device 121, navigation system 141, and/or vehicle 143 may be configured with one or more sensors for collecting the location data using sensors such as satellite-based location receivers (e.g., GPS), accelerometers, compass sensors, gyroscopes, altimeters, etc.

In one embodiment, the device 121, navigation system 141, and/or vehicle 143 may provide a speech interface for global voice-based entry of geographic information to request navigation or mapping related services. By way of example, these services can be provided by a service platform 145, one or more services 147a-147m (also collectively referred to as services 147), one or more content providers 149a-149k (also collectively referred to as content providers 149), or a combination thereof. In one embodiment, the service platform 145 and/or the services 147 may include one or more search engines that can be used by the system 120 to query for possible locations associated with a given word w for a tag C. For example, the service platform 145 and/or services 147 can store search histories of a specific user to determine what search words are used, and what location results are returned for those search words for a given user. In one embodiment, the service platform 145 and/or services 147 can also record a mobility history data of the user (e.g., times and locations visited by a user). The system 120 can then use the search histories and mobility histories to determine whether a user visited a location indicated in a search result after searching for a given word w corresponding to a tag C.

In one embodiment, the device 121, navigation system 141, and/or vehicle 143 may execute a client application (e.g., application 125) to access the services or functions of the service platform 145, the services 147, and/or the content providers 149. Through these services, the application 125 may acquire navigation information, location information, mapping information, other data associated with the current location, direction of movement along a roadway, etc. of the device 121, navigation system 141, and/or vehicle 143.

By way of example, the device 121 may be any mobile computing device including, but not limited to, an in-vehicle navigation system 141, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system.

As discussed above, the device 121, navigation system 141, and/or vehicle 143 may be configured with various sensors for acquiring and/or generating location data. For example, the sensors may be used as GPS receivers for interacting with one or more satellites to determine and track the current speed, position and location of a vehicle travelling along a roadway. In addition, the sensors may gather tilt data (e.g., a degree of incline or decline of the vehicle during travel), motion data, light data, sound data, image data, weather data, temporal data and other data associated with the device 121, navigation system 141, and/or vehicle 143. Still further, the sensors may detect local or transient network and/or wireless signals, such as those transmitted by nearby devices during navigation along a roadway. This may include, for example, network routers configured within a premise (e.g., home or business), other devices or vehicles, or a communicable traffic system (e.g., traffic lights, traffic cameras, traffic signals, digital signage).

By way of example, the navigational speech interface 100 and/or the language model adaptation platform 137 may be implemented as a cloud based service, hosted solution or the like for performing the above described functions. Alternatively, the navigational speech interface 100 and/or the language model adaptation platform 137 may be directly integrated for processing data received, generated, and/or provided by the service platform 145, services 147, content providers 149, and/or applications 125. Per this integration, the navigational speech interface 100 and/or the language model adaptation platform 137 may perform client-side mobility-based language adaptation and speech recognition as discussed with respect to the various embodiments described herein.

By way of example, the communication network 135 of system 120 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the navigational speech interface 100 and/or the language model adaptation platform 137 may communicate with each other and other components of the system 120 using well known, new or still developing protocols. In this context, a protocol includes a set of rules defining how the network nodes within the communication network 135 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
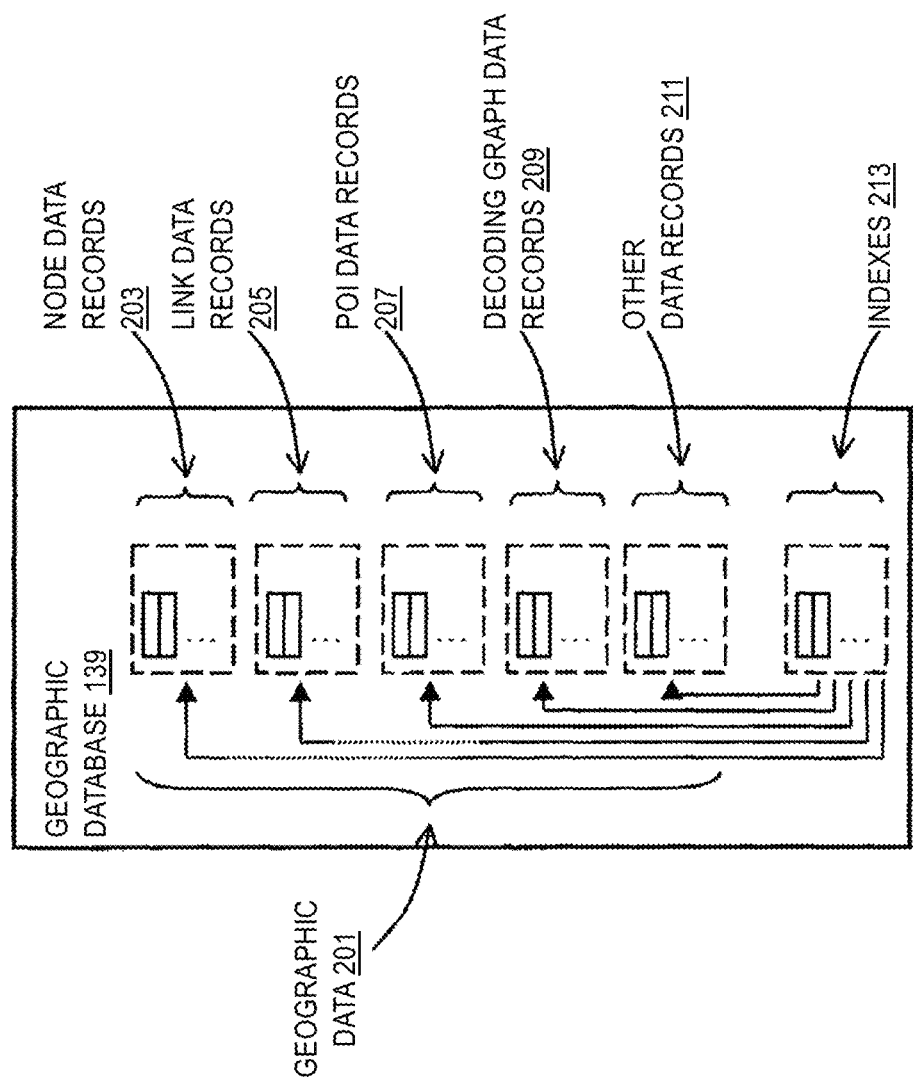
FIG. 2 is a diagram of a geographic database, according to one embodiment.

FIG. 2 is a diagram of the geographic database 139, according to one embodiment. In one embodiment, the language models 129 used by the navigational speech interface 100 and/or the language model adaptation platform 137 include the location entities stored within the geographic database 139. Accordingly, location entities incorporated in the language models 129 can be queried from the geographic database 139. In one embodiment, the navigational speech interface 100 and/or the language model adaptation platform 137 can also determine mobility and spatial relevance of elements of the language models 129 using the geographic database 139. In one embodiment, the language models 129 and/or the spatial partitions thereof can be stored, associated with, and/or linked to the geographic database 139 or data thereof.

In one embodiment, the geographic or map database 139 includes geographic data 201 used for (or configured to be compiled to be used for) spatial partitioning of a global speech decoding graph. The geographic data 201 can also be used for mapping and/or navigation-related services, such as for route information, service information, estimated time of arrival information, location sharing information, speed sharing information, and/or geospatial information sharing, according to exemplary embodiments. For example, the geographic data 201 includes node data records 203, road segment or link data records 205, POI data records 207, language model data records 209, other data records 211, and/or indexes 213 for example. More, fewer or different data records can be provided.

In one embodiment, the indexes 213 may improve the speed of data retrieval operations in the geographic database 139. In one embodiment, the indexes 213 may be used to quickly locate data (e.g., decoding graph data records 209) without having to search every row in the geographic database 139 every time it is accessed. In one embodiment, the other data records 211 include cartographic ("carto") data records, routing data, and maneuver data. As noted above, the maneuver data identify potential maneuvers within a network comprised of two or more adjacent road links. In other words, a maneuver indicates possible turns or other actions a device traveling a transportation network can take. In one embodiment, maneuvers are defined at intersections nodes where different turns or actions can be taken. Each maneuver would then comprise the links making up each possibility (e.g., links indicating a left turn at the intersection node, a right turn at an intersection node, continuing straight at an intersection node, etc.).

In one embodiment, one or more portions, components, areas, layers, features, text, and/or symbols of the POI or event data can be stored in, linked to, and/or associated with the geographic data 201 using the POI data records 207. For example, one or more portions of a POI and/or characteristics of the POI (e.g., descriptive metadata, related event data, etc.) can be matched with respective map or geographic records via position or GPS data associations (such as using known or future map matching or geo-coding techniques), for example. In one embodiment, the POI data records 207 may also include information on locations of traffic controls (e.g., stoplights, stop signs, crossings, etc.).

In exemplary embodiments, the road segment or link data records 205 are links or segments representing roads, streets, or paths can be used to determine mobility and/or spatial relevance for mobility-based adaptation of language models.

The link data records 205 can include road density information that represent at least a physical length of a link. In some embodiments, the length or road density of link can be measured directly from the road way or may be calculated as the distance between the starting and ending nodes of the link. In one embodiment, the one or more adjacent links can be combined into a super link as discussed in the various embodiments described herein. In this case, the link data records 205 can also store information on super links that have been created, and information on the regular links included the corresponding super link. The link data records can also indicate a direction of travel along the link to facilitate determining available paths through a road network. In one embodiment, the node data records 203 are end points corresponding to the respective links or segments of the road segment data records 205.

The road link data records 205 and the node data records 203 represent a road network, such as used by vehicles, cars, and/or other entities. In other words, the nodes and links of the data records 203 and 205 comprise a system for representing the geospatial characteristics of a transportation the nodes represent various location points (e.g., latitude and longitude) of the network and the links represent an extent of a road or path between the nodes. Generally, the nodes are located at intersections points of the road network to minimize the number of nodes needed to represent a transportation network. However, in some embodiments, a node can also fall at a non-intersection point. In which case, the node at the non-intersection can be a shape node which can be used to indicate or more closely follow a road or path with a more complex shape. Alternatively, the geographic database 139 can contain path segment and node data records or other data that represent pedestrian paths or areas in addition to or instead of the vehicle road record data, for example.

The road link and nodes can be associated with attributes, such as a functional class, a road density or link length, a speed attribute (e.g., speed limit along a link, a free-flow speed of traffic along a link, and/or any other indication of an expected speed of travel along the link), parking availability information, geographic coordinates, street names, address ranges, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. As indicated above, the geographic data 201 can include data about the POIs and their respective locations in the POI data records 207. The geographic data 201 can also include data about places or administrative units, such as cities, towns, or other communities, and other geographic features, such as bodies of water, mountain ranges, etc. Such place or feature data can be part of the POI data or can be associated with POIs or POI data records 207 (such as a data point used for displaying or representing a position of a city). In one embodiment, POI data records 207 specify POI names, locations, etc. that can be at least a portion of the location entities included the decoding graphs. Other examples of location entities include, but are not limited to, the labels or names associated with the places, administrative units, features, etc. of the geographic database 139.

In one embodiment, the geographic data 201 also includes language model records 209 that can store either the language models (e.g., adapted or non-adapted) or pointers to the spatial partitions. The language model data records 209 can also store information to map the entities, words, terms, etc., stored in the language models to corresponding location or areas of the map. In one embodiment, the digital map of the geographic database 139 can be stored in as a tile-based representation. Accordingly, the location entities in of the language models can be associated with a respective map tile or other equivalent area of the geographic map. In one embodiment, the language models can be a prior probability distribution that is then transmitted to the device 121 for adaptation using local mobility and search data. In addition or alternatively, the language models can be adapted on the server side using, e.g., remote mobility and search data available for a given user on the network side. The adapted language model and related data used or generated to adapt the language model can be stored in the language model data records 209.

In one embodiment, the geographic data 201 and/or the language models stored in the language model data records 209 can be maintained by the content provider 149 in association with the service platform 145 (e.g., a map developer). The map developer can collect geographic data to generate spatial partitions of language models, and/or the mobility and search data for each user.

In one embodiment, there can be different ways used by the map developer to collect data for storage in the geographic database 139. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 139 and/or the language models contained therein can be a master database stored in a format that facilitates updating, maintenance, and development. For example, the master geographic database 139 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data, geospatial information, and/or related spatial speech language models/decoding graphs/partitions are compiled (such as into a platform specification format (PSF) format) to organize and/or configure the data for voice-based interactions to perform map or navigation-related functions and/or services, such as VDE, map annotation, route calculation, route guidance, map display, speed calculation, distance and travel time functions, and other functions, by a navigation device, such as by the device 121, navigation system 141, and/or vehicle 143, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 139 can be a master geographic database, but in alternate embodiments, the geographic database 139 can represent a compiled navigation database that can be used in or with end user devices to provide navigation- or mapping-related functions. For example, the geographic database 139 can be used with the end user device 121 to configure the device 121 for voice-based interactions using an adapted language model according to the various embodiments describe herein. In such a case, the geographic database 139 (e.g., including the language model data records 209) can be downloaded or stored on the end user device (e.g., device 121, navigation system 141, vehicle 143, etc.), such as in application 125 or memory 127, or the end user devices 121, 141, and/or 143 can access the geographic database 139 through a wireless or wired connection (such as via a server, e.g., the language model adaptation platform 137, over the communication network 135), for example.

Figure 3:
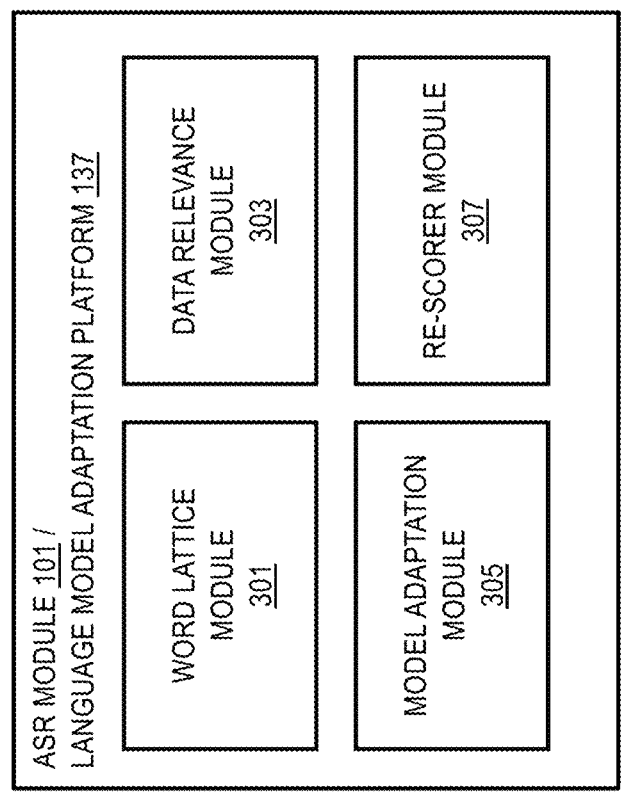
FIG. 3 is a diagram of the components of an ASR module and/or a language model adaptation platform, according to one embodiment.

FIG. 3 is a diagram of the components of an ASR module and/or a language model adaptation platform, according to one embodiment. In one embodiment, the functions discussed with respect to the various embodiments described herein for providing mobility-based language model adaptation can be performed locally at a device 121 by the ASR module 101 of the navigational speech interface 100 and/or remotely by the language model adaptation platform 137. The ASR module 101 and/or the language model adaptation platform 137 can operate alone or in combination to perform these functions. Accordingly, the ASR module 101 and/or the language model adaptation platform 137 can include the same or similar components. It is noted that when the embodiments described herein refer to either the ASR module 101, navigational speech interface 100, or the language model adaptation platform 137, it is contemplated that the embodiments apply equally to any of the three components.

By way of example, the ASR module 101 and/or the language model adaptation platform 137 include one or more components for mobility-based language model adaptation. It is contemplated that the functions of these components may be combined or performed by other components of equivalent functionality. In one embodiment, the ASR module 101 and/or the language model adaptation platform 137 can include any of the components described with respect to the FIGS. 1A and 1C above. In addition or alternatively, the components of the ASR module 101 and/or the language model adaptation platform 137 can include, at least, a word lattice module 301, a data relevance module 303, a model adaptation module 305, and a re-scorer module 307. The above presented modules and components of the ASR module 101 and/or the language model adaptation platform 137 can be implemented in hardware, firmware, software, or a combination thereof. Though depicted as a separate entity in FIG. 1B, it is contemplated that the ASR module 101 and/or the language model adaptation platform 137 may be implemented as a module of any of the components of the system 120. In another embodiment, one or more of the modules 301-307 may be implemented as a cloud based service, local service, native application, or combination thereof. The functions of these modules 301-307 are discussed with respect to FIG. 4 below.

Figure 4:
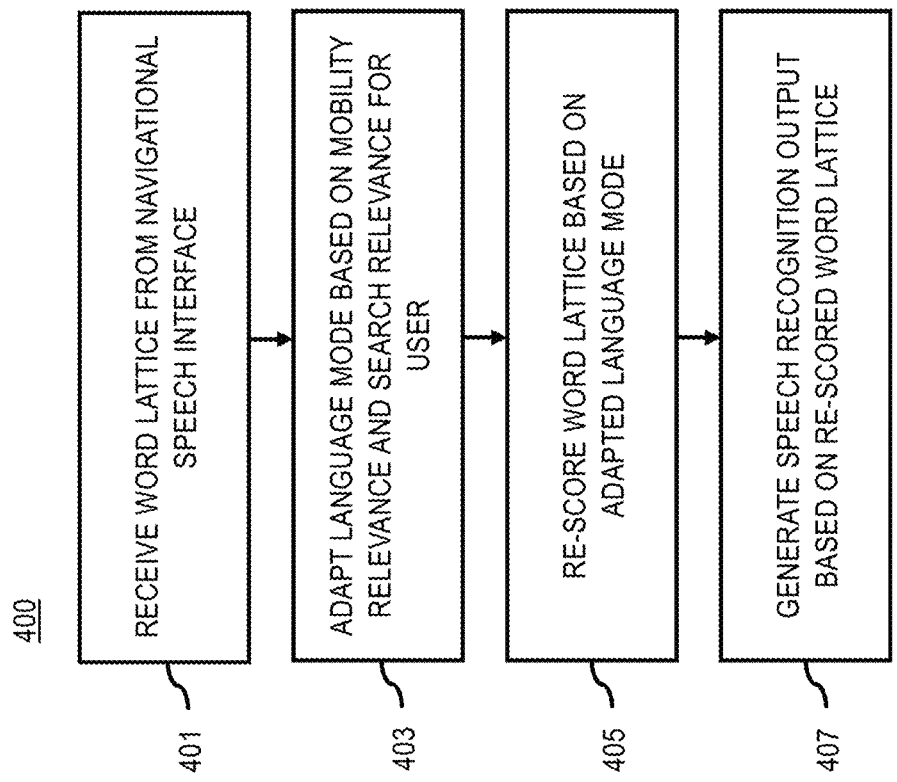
FIG. 4 is a flowchart of a process for providing mobility-based language model adaptation for navigational speech interfaces, according to one embodiment.
Figure 7:
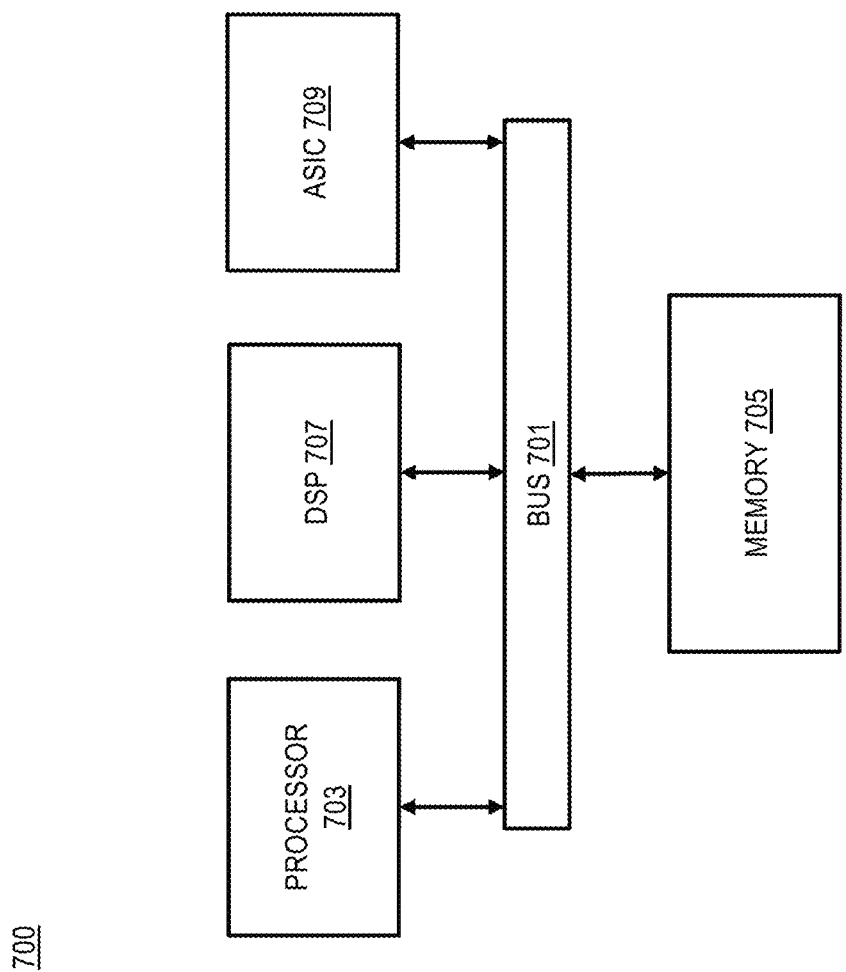
FIG. 7 is a diagram of a chip set that can be used to implement an embodiment of the invention.

FIG. 4 is a flowchart of a process for providing mobility-based language model adaptation for navigational speech interfaces, according to one embodiment. In various embodiments, the ASR module 101, the language model adaptation platform 137, and/or the modules 301-307 as shown in FIG. 3 may perform one or more portions of the process 400 and may be implemented in, for instance, a chip set including a processor and a memory as shown in FIG. 7. As such, the ASR module 101, the language model adaptation platform 137, and/or the modules 301-307 can provide means for accomplishing various parts of the process 400, as well as means for accomplishing embodiments of other processes described herein in conjunction with other components of the system 120. Although the process 400 is illustrated and described as a sequence of steps, it is contemplated that various embodiments of the process 400 may be performed in any order or combination and need not include all of the illustrated steps.

As discussed above, in one embodiment, the ASR module 101 applies language models at two different stages of the speech recognition pipeline described in FIG. 1C. This two model (e.g., a low resolution model 173 and high resolution model 177) approach enables the high resolution to be more memory efficient while providing a potentially more specific vocabulary match. For example, in the pipeline of FIG. 1C, the decoder 169 generates an initial word lattice including scores for the most likely sequence of matching words for a given audio input or clip using the low resolution language model 173. Then the word lattice is rescored using a high resolution language model 177 generate a speech recognition output.

In one embodiment, the embodiments of the language model application process can be applied at this re-scoring stage to refine the high resolution language model 177 to improve speech recognition results. However, it is also contemplated that language model adaptation according to the embodiments described herein can also be applied to the low resolution language model 173 alone or in combination with the high resolution language model 177. In addition, the embodiments described herein can also be applied to speech recognition pipelines that use an approach with only one language model or more than two language models.

In step 401, the word lattice module 301 receives a word lattice resulting from an automatic speech recognition process applied on a speech input received from a user via the navigational speech interface 100. The word lattice includes a respective speech recognition score for each word in the word lattice. For example, this initial word lattice is generated using a low resolution language model and/or any other equivalent speech recognition language model as described above. The word lattice, for instance, includes a set of location entities or include words, terms, etc. that can be resolved into location entities, as well as not location-based words. This set includes the most likely sequences that match the user speech input as determined from the low resolution language model. In one embodiment, a location entity refers to any word or term that describes or is associated with a geographic location or area (e.g., street name, city name, POI name, etc.). In one embodiment, a location entity can also include possible values for a given location-based tag. For example, for a <street-name> tag, each location entity can be a different street name, for a <city-name> tag, each location entity can be a different city name, etc. Accordingly, the locations associated with each location entity can be based on or derived from its name, word, term, etc. that is used to label the location entity in the word lattice.

In step 403, the model adaptation module 305 adapts a language model (e.g., a high resolution or second language model in a speech recognition pipeline) comprising a plurality of location entities based on a mobility relevance and a search relevance of the plurality of location entities to the user. Because the word lattice is generated from the language model, the model can include a superset of the location entities, words, terms, etc. from which the word lattice is generated and scored. In one embodiment, the data relevance module 303 determines the mobility relevance and the search relevance by computing a probability of the user visiting the one or more locations associated with said each word after the user queries said each word for at least one of the plurality of location tags. In other words, the model adaptation module 305 can use a specific user's mobility and search data to determine whether a particular location entity in the language model appears in the data to refine the underlying distribution of the location entities (e.g., words w of a tag C) and adapt the model to the individual user. As a result, each user's adapted language model can have different probability distributions of the locations entities or words in the model based on their unique mobility and search experiences.

As previously discussed, the model adaptation module 305 can use a variety of processes to adapt the language model. In one embodiment, the data relevance module 303 determines a device location or a user location associated with the navigational speech interface. In other words, the model adaptation module 305 interacts with the data relevance module 303 to use a location of the user or user device to determine a spatial relevance of the location entities in the language model to the user. The probability of the user visiting the one or more locations as well as the determined distribution of the location entities in the language model can then be further based on the device location or the user location.

The data relevance module 303 can use any process to determine spatial relevance. In one embodiment, the data relevance module 303 selects one or more location entities based on a distance threshold from the device location or the user location. By selecting location entities that are near the user within a threshold distance, the data relevance module 303 can adapt the language model so that locations entities closer to the user or user device are scored more highly. The model adaptation module 305 can then compute the probability of the user visiting the selected location entities to refine the language model based on this proximity threshold. For example, the model adaptation module 305 can adapt the distribution of the locations entities so that more proximate location entities will be considered to be more likely matches for a given speech input.

In one embodiment, the data relevance module 303 can determine a frequency of visits by the user to the one or more location entities in the language model. The frequency can be determined from a mobility history of the user collected over a period of time (e.g., a predetermined period of time). In one embodiment, a histogram of the frequency of visits to an N number of most frequently visited location entities can be created. The probability of the user visiting the one or more location entities and therefore the mobility and search relevance can be further based on the frequency data or histogram.

In one embodiment, the data relevance module 303 determines or retrieves a mobility history of the user. The mobility history, for instance, records location entities visited by the user. The data relevance module 303 can then select the one or more locations that are in the mobility history. The mobility relevance and the search relevance are based on the selected one or more locations. This embodiment is a special case of the embodiment above where the frequency of visits equals 1, so that any visit can be used as a means for adapting the location entity probability distribution of the language model.

In yet another embodiment, the probability of the user visiting the one or more locations can be further stratified and computed according to contextual parameters. These parameters can include, but are not limited to, location parameters, temporal parameters, activity parameters, and/or another other context that can be sensed or measured by the system 120 (e.g., via device 121, navigation system 141, vehicle 143, etc.). For example, with respect to location parameters, a user's mobility data may indicate that the user has different destinations when starting from a first location versus starting from a second location. Similarly, with respect to temporal parameters, the mobility data may indicate that a user has different destinations at different times of the day, days of the week, months of the year, etc. In one embodiment, the temporal parameter is modeled cyclically so that different repeating location patterns can be observed over a specified period (e.g., hourly, daily, weekly, etc.).

In step 405, the re-scorer module 307 initiates a re-scoring of each word in the received word lattice using the adapted language model. In one embodiment, the re-scoring of the word lattice comprises normalizing the respective speech recognition score for said each word against a sum of all speech recognition scores of said each word associated with a device location or a user location. In this way, when a speech input can be matched phonetically to different possible location entities, the re-scorer module 307 can use the adapted language module to re-score the possible location entities based on the user mobility and search relevance. The re-scorer module 307 then generates a speech recognition output for the speech input based on the re-scored word lattice (step 407). In this way, the re-scorer module 307 can be more likely to accurately interpret a location entity uttered in a user's voice command or voice input into the navigational speech interface 100.

Figure 5:
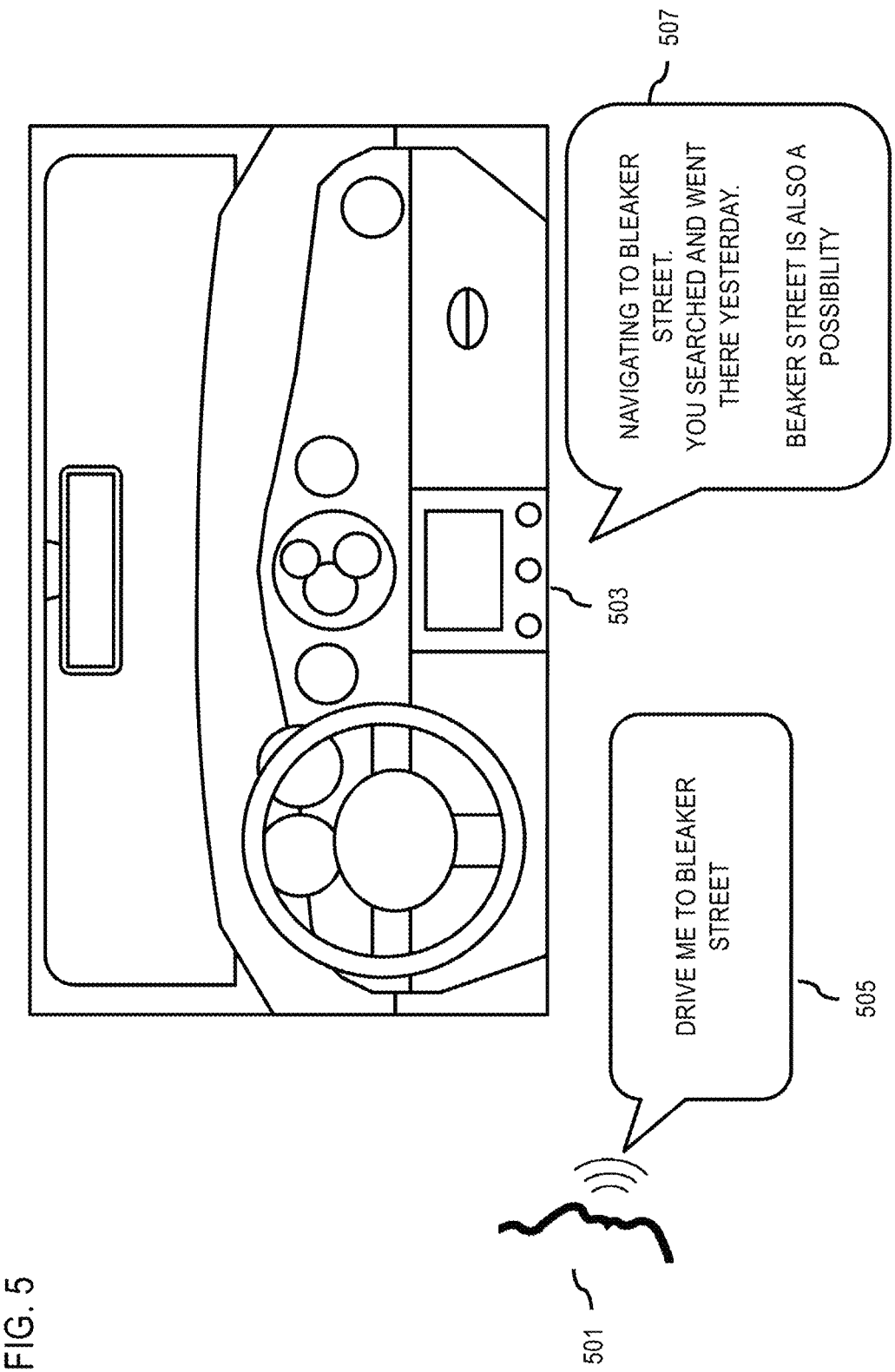
FIG. 5 is a diagram illustrating a user interaction with a navigation system configured for mobility-based language model adaptation, according to one embodiment.

FIG. 5 is a diagram illustrating a user interaction with a navigation system configured for mobility-based language model adaptation, according to one embodiment. In the example of FIG. 5, a user 501 is interacting with a navigation system 503 configured with voice destination entry (VDE) based on a navigational speech interface 100. The user 501 initiates a voice command 505 by stating to the system 503, "Drive me to Bleaker Street." This voice signal input is captured and processed by the navigation speech interface 100 of the system 503.

In this example, the navigational speech interface 100 generates an initial word lattice of the possible matches for the speech input to generate a word lattice. For example, this initial word lattice shows two possible matches (e.g., "Drive me to Beaker Street" and "Drive me to Bleaker Street") that are scored almost identically because they are phonetically very similar. As part of the processing the speech input is composed into a tag based statement in which the carrier phrase is recognized and a <street-name> tag incorporated to result in "Drive me to <street-name>" with the initial word-lattice containing "Beaker Street" and "Bleaker Street" as likely matches for the <street-name> tag.

To further process this speech input, the ASR module 101 of the navigational speech interface 100 retrieves a mobility and search history specific to the user providing the initial speech input. The mobility and search data of the user, for instance, indicates that the user searched for "Bleaker Street" and then traveled to "Bleaker Street" after the search, but did not do so for "Beaker Street." Accordingly, the ASR module 101 adapts the language model to modify the probability distribution of "Bleaker Street" to increase its probability over the alternative "Beaker Street." The ASR module 101 rescores the word lattice based on the adapted language model, which then outputs "Bleaker Street" as the more likely match for the speech input.

In one embodiment, the resulting speech recognition output can be output directly to the user to initiate a navigation task to "Bleaker Street" which can also be confirmed by generated prompt and TTS to the user. However, as shown in the example of FIG. 5, in addition to confirming "Navigating to Bleaker Street" as shown in voice prompt 507, the system 503 can also indicate that it knows the mobility and search history of the user and used it to determine that "Bleaker Street" is the most likely interpretation of the user's speech input and explain "You search and went there yesterday." In yet another embodiment, the system 120 can provide the second most likely matching location entity (e.g., "Beaker Street") as an option by adding to the prompt "Beaker Street is also a possibility."

The processes described herein for providing mobility-based language model adaptation for a navigational speech interface may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
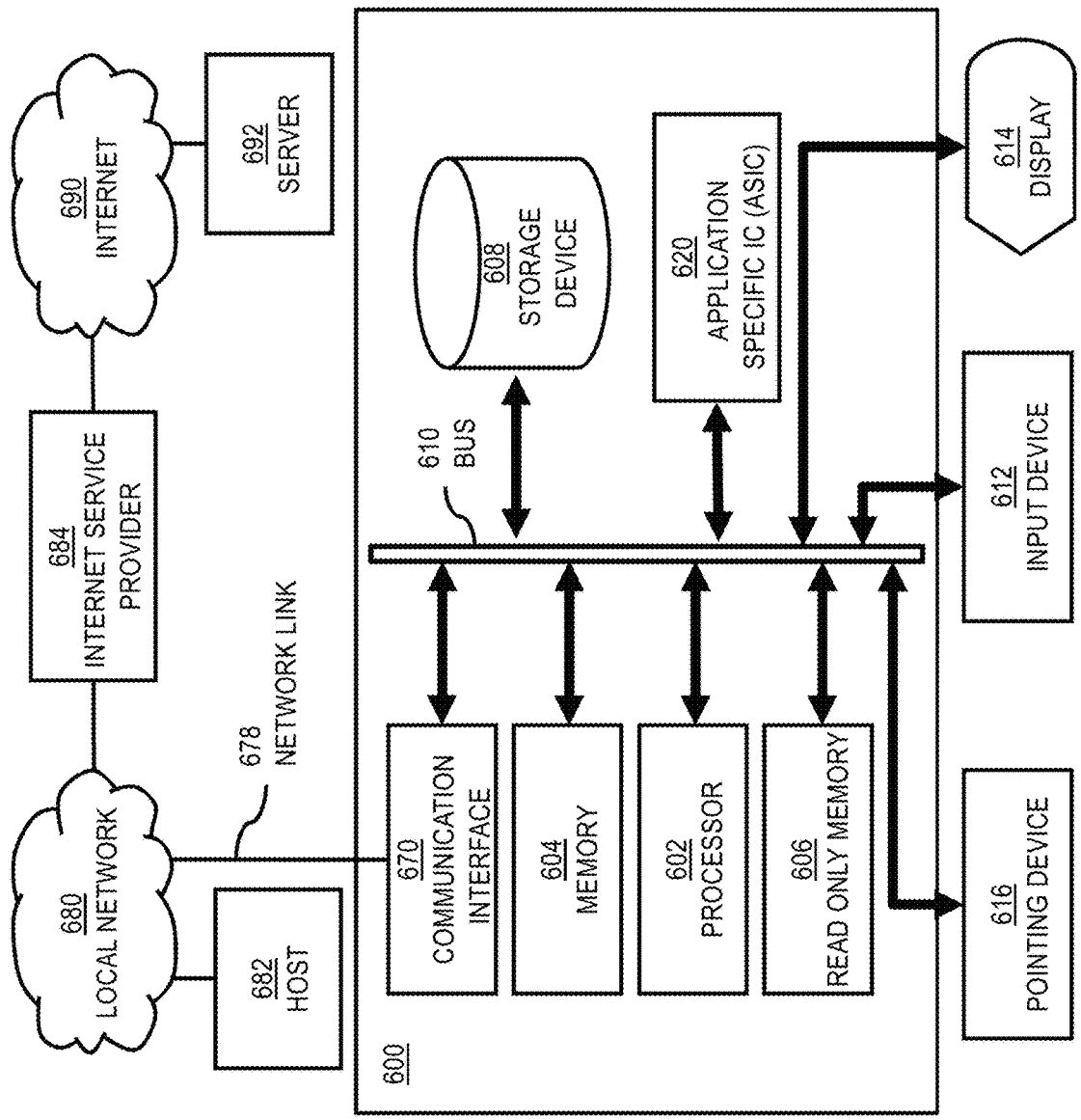
FIG. 6 is a diagram of hardware that can be used to implement an embodiment of the invention.

FIG. 6 illustrates a computer system 600 upon which an embodiment of the invention may be implemented. Computer system 600 is programmed (e.g., via computer program code or instructions) to provide mobility-based language model adaptation for a navigational speech interface as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to providing mobility-based language model adaptation for a navigational speech interface. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for providing mobility-based language model adaptation for a navigational speech interface. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing mobility-based language model adaptation for a navigational speech interface, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, network link 678 may provide a connection through local network 680 to host 682 or to an equipment operated by an Internet Service Provider 684. The Internet Service Provider 684 in turn provides data communication services through the public, world-wide packet-switching communication network of networks now commonly referred to as the Internet 690. A computer called a server 692 connected to the Internet hosts a process that provides a service in response to information received over the Internet. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 135 for providing mobility-based language model adaptation for a navigational speech interface.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 7 illustrates a chip set 700 upon which an embodiment of the invention may be implemented. Chip set 700 is programmed to provide mobility-based language model adaptation for a navigational speech interface as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide mobility-based language model adaptation for a navigational speech interface. The memory 705 also stores the data associated with or generated by the execution of the inventive steps.

Figure 8:
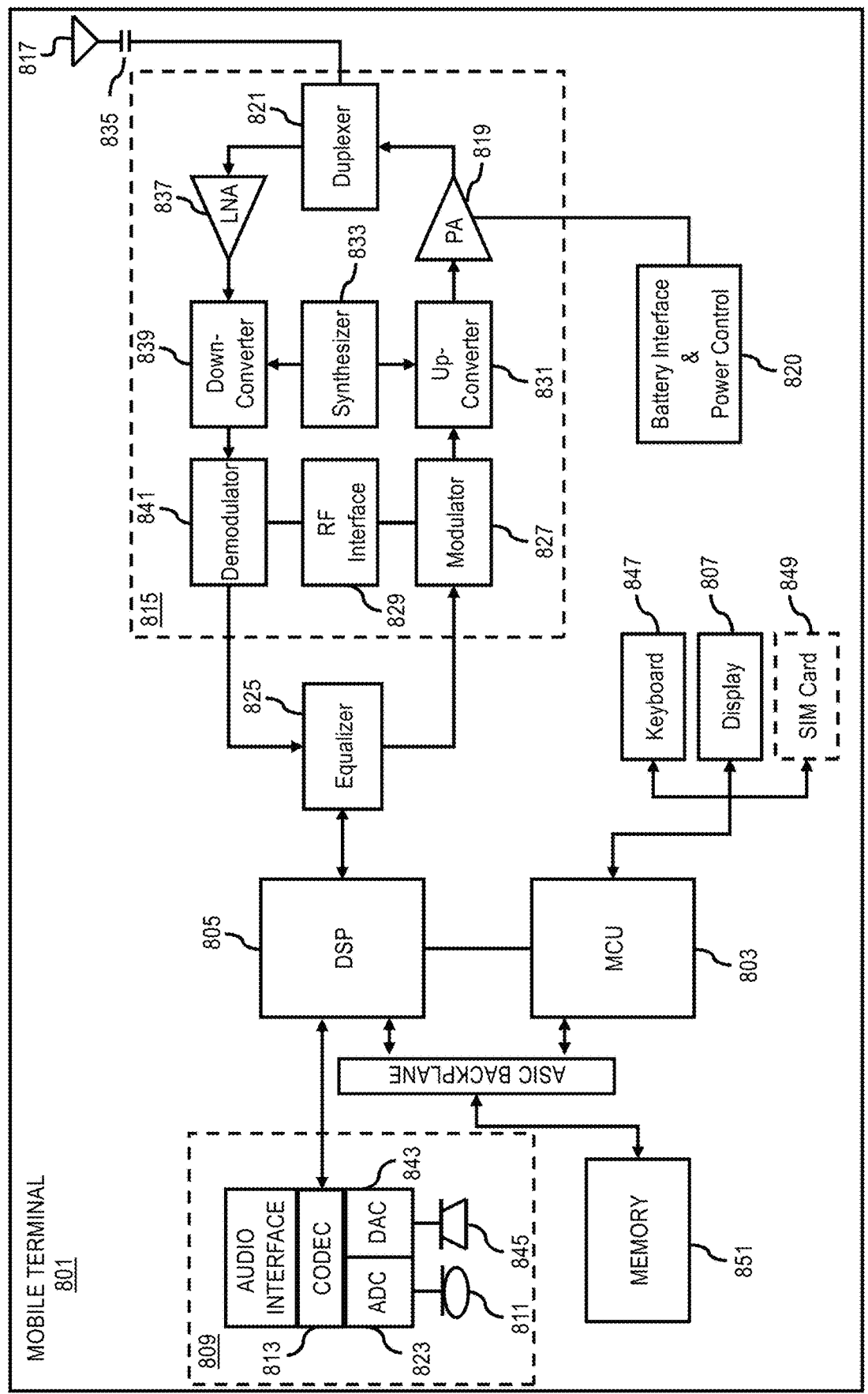
FIG. 8 is a diagram of a device (e.g., embedded or mobile computer) that can be used to implement an embodiment of the invention.

FIG. 8 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile station functions that offer automatic contact matching. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile station 801 to provide mobility-based language model adaptation for a navigational speech interface. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the station. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 851 may be, but not limited to, a single memory, CD, DVD, ROM, RAM, EEPROM, optical storage, or any other non-volatile or non-transitory storage medium capable of storing digital data.

An optionally incorporated SIM card 849 carries, for instance, important information, such as the cellular phone number, the carrier supplying service, subscription details, and security information. The SIM card 849 serves primarily to identify the mobile station 801 on a radio network. The card 849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer implemented method for language model adaptation for a navigational speech interface comprising:
   receiving a word lattice resulting from an automatic speech recognition process applied on a speech input received from a user via the navigational speech interface, wherein the word lattice includes a respective speech recognition score for each word in the word lattice;
   adapting for the user a language model comprising a plurality of location entities based on a search history of the user and a mobility history of the user, wherein the mobility history includes one or more locations previously visited by the user and located within a distance threshold from a current device location or a current user location associated with the user, wherein the search history includes one or more search words used by the user and one or more location results returned for the one or more search word, wherein the language model is adapted using a probability of the user visiting one or more of the location entities, and wherein the probability is computed at least based on a search frequency that is determined via querying the search history of the user per said each word for a corresponding location tag in the language model, and determining the search frequency by the user per location tag;
   initiating a re-scoring of said each word in the word lattice using the adapted language model; and
   generating a speech recognition output for the speech input based on the re-scored word lattice.

2. The method of claim 1, further comprising:
   determining the current device location or the current user location,
   wherein the probability of the user visiting the one or more location entities is further based on the current device location or the current user location.

3. The method of claim 2, wherein the mobility history of the user is based, at least in part, on travel history information of the user, and wherein one or more of the location entities closer to the current device location or the current user location are scored higher than the remaining location entities in the adapted language model.

4. The method of claim 1, further comprising:
   determining a frequency of visits by the user per location for the one or more locations within the distance threshold,
   wherein the probability of the user visiting the one or more location entities is further based on the frequency of visits.

5. The method of claim 1, wherein the language model is a probability distribution of one or more users visiting the location entities associated with said each word.

6. The method of claim 1, wherein the mobility history further includes temporal data of the one or more locations visited by the user, and wherein the probability of the user visiting the one or more location entities is further based on the temporal data.

7. The method of claim 6, wherein the temporal data is modeled into the probability cyclically.

8. The method of claim 1, wherein the re-scoring of the word lattice comprises normalizing the respective speech recognition score for said each word against a sum of all speech recognition scores of said each word associated with the current device location or the current user location.

9. An apparatus for language model adaptation for a navigational speech interface comprising:
   at least one processor; and
   at least one memory including computer program code for one or more programs,
   the at least one memory and the computer program code configured to, with the at least one processor, cause the apparatus to perform at least the following,
   receive a word lattice resulting from an automatic speech recognition process applied on a speech input received from a user via the navigational speech interface, wherein the word lattice includes a respective speech recognition score for each word in the word lattice;
   adapt for the user a language model comprising a plurality of location entities based on a search history of the user and a mobility history of the user, wherein the mobility history includes one or more locations previously visited by the user and located within a distance threshold from a current device location or a current user location associated with the user, wherein the search history includes one or more search words used by the user and one or more location results returned for the one or more search word, wherein the language model is adapted using a probability of the user visiting one or more of the location entities, and wherein the probability is computed at least based on a search frequency that is determined via querying the search history of the user per said each word for a corresponding location tag in the language model, and determining the search frequency by the user per location tag;

initiate a re-scoring of said each word in the word lattice using the adapted language model; and generate a speech recognition output for the speech input based on the re-scored word lattice.

10. The apparatus of claim 9, wherein the apparatus is further caused to:

determine the current device location or the current user location, wherein the probability of the user visiting the one or more location entities is further based on the current device location or the current user location.

11. The apparatus of claim 10, wherein the apparatus is further caused to:

select the one or more location entities based on the distance threshold from the current device location or the current user location, wherein the probability of the user visiting the one or more locations is with respect to the selected one or more location entities.

12. The apparatus of claim 9, wherein the apparatus is further caused to:

determine a frequency of visits by the user per location for the one or more locations within the distance threshold, wherein the probability of the user visiting the one or more location entities is further based on the frequency of visits.

13. The apparatus of claim 9, wherein the re-scoring of the word lattice further causes the apparatus to normalize the respective speech recognition score for said each word against a sum of all speech recognition scores of said each word associated with the current device location or the current user location.

14. A non-transitory computer-readable storage medium for automatic speech recognition in a device, carrying one or more sequences of one or more instructions which, when executed by one or more processors, cause an apparatus to at least perform the following steps:

receiving a word lattice resulting from an automatic speech recognition process applied on a speech input received from a user via the navigational speech interface, wherein the word lattice includes a respective speech recognition score for each word in the word lattice;

adapting for the user a language model comprising a plurality of location entities based on a search history of the user and a mobility history of the user, wherein the mobility history includes one or more locations previously visited by the user and located within a distance threshold from a current device location or a current user location associated with the user, wherein the search history includes one or more search words used by the user and one or more location results returned for the one or more search word, wherein the language model is adapted using a probability of the user visiting one or more of the location entities, and wherein the probability is computed at least based on a search frequency that is determined via querying the search history of the user per said each word for a corresponding location tag in the language model, and determining the search frequency by the user per location tag;

initiating a re-scoring of said each word in the word lattice using the adapted language model; and generating a speech recognition output for the speech input based on the re-scored word lattice.

15. The non-transitory computer-readable storage medium of claim 14, wherein the mobility history of the user is based, at least in part, on travel history information.

16. The non-transitory computer-readable storage medium of claim 14, wherein the apparatus is further caused to perform:

determining a frequency of visits by the user per location for the one or more locations within the distance threshold, wherein the probability of the user visiting the one or more location entities is further based on the frequency of visits.

17. The non-transitory computer-readable storage medium of claim 14, wherein the re-scoring of the word lattice comprises normalizing the respective speech recognition score for said each word against a sum of all speech recognition scores of said each word associated with the current device location or the current user location.

* * * * *